(12) United States Patent
Matsushima (10) Patent No.: US 8,235,184 B2
(45) Date of Patent: Aug. 7, 2012

(54) DISC BRAKE DEVICE

(75) Inventor: Toru Matsushima, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 652 days.

(21) Appl. No.: 12/307,132

(22) PCT Filed: Dec. 19, 2007

(86) PCT No.: PCT/JP2007/075043
§ 371 (c)(1),
(2), (4) Date: Dec. 31, 2008

(87) PCT Pub. No.: WO2008/075783
PCT Pub. Date: Jun. 26, 2008

(65) Prior Publication Data
US 2009/0283372 A1   Nov. 19, 2009

(30) Foreign Application Priority Data
Dec. 20, 2006  (JP) ................................. 2006-343183

(51) Int. Cl.
*F16D 65/092* (2006.01)
(52) U.S. Cl. .................. 188/73.37; 188/73.1; 188/250 B
(58) Field of Classification Search ................. 188/73.1, 188/73.37, 73.39, 250 R, 250 B
See application file for complete search history.

(56) References Cited

U.S. PATENT DOCUMENTS

| | | | | |
|---|---|---|---|---|
| 2,940,554 A | * | 6/1960 | Cameron | 188/153 R |
| 4,444,296 A | * | 4/1984 | Marianu | 188/72.2 |
| 6,494,301 B1 | | 12/2002 | Wirth | |
| 6,651,785 B2 | * | 11/2003 | Cornolti et al. | 188/73.1 |
| 7,798,294 B2 | * | 9/2010 | Iraschko | 188/73.37 |
| 2002/0170788 A1 | | 11/2002 | Cornolti et al. | |
| 2005/0194223 A1 | | 9/2005 | Murayama | |

FOREIGN PATENT DOCUMENTS

| | | | |
|---|---|---|---|
| DE | 2 211 013 | | 9/1973 |
| DE | 3232583 A1 | * | 3/1984 |
| DE | 196 23 867 A1 | | 1/1998 |
| DE | 19954309 A1 | * | 6/2001 |
| DE | 101 35 796 C1 | | 1/2003 |
| DE | 103 20 605 B3 | | 11/2004 |
| GB | 2 395 534 | | 5/2004 |
| JP | 59 150028 | | 10/1984 |
| JP | 61 24546 | | 2/1986 |

(Continued)

*Primary Examiner* — Thomas J Williams
(74) *Attorney, Agent, or Firm* — Oblon, Spivak, McClelland, Maier & Neustadt, L.L.P.

(57) ABSTRACT

A disc brake apparatus that can keep a stable contact state between a torque transmitting part of a brake pad and a torque receiving part of a mounting, so as to reliably suppress a brake noise phenomenon. At the time of forward braking where a main body member of a brake pad is pressed against a disc rotor, the rotational moment acting on the main body member of the brake pad from the disc rotor is absorbed by the main body member rotating relative to a forward braking torque transmitting member about one pin joint, so as to be restrained from being transmitted to the forward braking torque transmitting member. As a result, the respective contact states between two torque transmitting protrusions formed in the forward braking torque transmitting member of the brake pad and torque receiving surfaces formed in a forward braking torque receiving part of a mounting are held stable.

16 Claims, 5 Drawing Sheets

| | FOREIGN PATENT DOCUMENTS | | |
|---|---|---|---|
| JP | 06280909 A * | 10/1994 | |
| JP | 7-506417 | 7/1995 | |
| JP | 8 128474 | 5/1996 | |
| JP | 2002-174276 | 6/2002 | |
| JP | 2002 524699 | 8/2002 | |
| JP | 2002-250376 | 9/2002 | |
| JP | 2003 56611 | 2/2003 | |
| JP | 2003 519341 | 6/2003 | |
| JP | 2004-332871 | 11/2004 | |
| JP | 2005 249114 | 9/2005 | |

* cited by examiner

Fig.5

DISC BRAKE DEVICE

TECHNICAL FIELD

The present invention relates to a disc brake apparatus which is mounted as a braking apparatus to a vehicle, for example.

BACKGROUND ART

A disc brake apparatus has conventionally been known in general, which is constructed such that rotor surfaces of a disc rotor are held between a pair of brake pads, while a brake torque fed to the brake pads from the disc rotor is received by a torque receiving part of a mounting (torque member) on the vehicle body side, so as to yield a braking force.

In general, the brake pads in such a disc brake apparatus have a structure in which pad members coming into frictional contact with the rotor surfaces of the disc rotor under pressure are joined to backing metals. One end part of the backing metal to become the turning-out side of the disc rotor when the vehicle runs forward is integrally formed with a protruded forward braking torque transmitting part, while the other end part of the disc rotor to become the turning-out side of the disc rotor when the vehicle runs backward is integrally formed with a protruded backward braking torque transmitting part.

Correspondingly, the mounting on the vehicle body side is formed with a recessed forward braking torque receiving part which engages the protruded forward braking torque transmitting part formed in one end part of the backing metal of the brake pad, so as to receive the brake torque fed from the disc rotor at the time of forward braking of the vehicle, and a recessed backward braking torque receiving part which engages the protruded backward braking torque transmitting part formed in the other end part of the backing metal of the brake pad, so as to receive the brake torque fed from the disc rotor at the time of backward braking of the vehicle.

Here, in order for the brake pad to be able to slide in parallel with the rotary axis of the disc rotor, the recessed forward and backward braking torque receiving parts formed in the mounting are separated by predetermined clearances from the protruded forward and rearward braking torque transmitting parts formed in the backing metal, respectively (e.g., Japanese Patent Application Laid-Open No. 2005-249114 (Patent Document 1)).

DISCLOSURE OF THE INVENTION

Meanwhile, when the rotational moment acting on the brake pad varies dependent on the surface pressure distribution between the rotor surface of the disc rotor and the pad member of the brake pad at the time of forward braking, for example, the contact state (contact angle) between the protruded forward braking torque transmitting part in the backing metal of the brake pad and the recessed forward braking torque receiving part in the mounting may fluctuate unstably, thereby making it easier for the backing metal of the brake pad to vibrate, thus causing a so-called brake noise phenomenon.

It is therefore an object of the present invention to provide a disc brake apparatus which can reliably suppress the brake noise phenomenon by keeping a stable contact state between a torque transmitting part of a brake pad and a torque receiving part of a mounting.

The disc brake apparatus in accordance with the present invention is a disc brake apparatus constructed such that a brake torque fed to a brake pad from a disc rotor is received by a torque receiving part of a mounting; wherein the brake pad is divided into a main body member for receiving the brake torque while being pressed against the disc rotor, and a torque transmitting member for transmitting the brake torque while abutting against the torque receiving part of the mounting; and wherein the main body member and torque transmitting member are connected to each other so as to be rotatable relative to each other.

At the time of braking where the main body member of the brake pad is pressed against the disc rotor in the disc brake apparatus in accordance with the present invention, the brake torque fed to the main body member of the brake pad from the disc rotor is received by the torque receiving part of the mounting by being transmitted thereto through the torque transmitting member of the brake pad. Here, the rotational moment acting on the brake pad from the disc rotor is absorbed by the main body member of the brake pad rotating relative to the torque transmitting member, so as to be restrained from being transmitted to the torque transmitting member. As a result, the contact state between the torque transmitting member of the brake pad and the torque receiving part of the mounting is held stable, so as to restrain the brake pad from vibrating, thereby reliably suppressing the brake noise phenomenon.

In the disc brake apparatus in accordance with the present invention, the main body member and torque transmitting member may be connected to each other so as to be rotatable relative to each other through a pin joint.

Here, it will be preferred in the disc brake apparatus in accordance with the present invention if the torque transmitting member of the brake pad abuts against the torque receiving part of the mounting by two points so as to abut thereagainst in a stable state.

Preferably, the main body member has a structure for abutting against the torque receiving part of the mounting such as to suppress a rotational moment acting on the main body member.

In the disc brake apparatus in accordance with the present invention, the rotational moment acting on the brake pad at the time of braking is absorbed by the main body member of the braking pad rotating relative to the torque transmitting member, so as to be restrained from being transmitted to the torque transmitting member. Therefore, the present invention can keep a stable contact state between the torque transmitting member of the brake pad and the torque receiving part of the mounting, thereby restraining the brake pad from vibrating, thus reliably suppressing the brake noise phenomenon.

BEST MODES FOR CARRYING OUT THE INVENTION

In the following, the best embodiments of the disc brake apparatus in accordance with the present invention will be explained with reference to the drawings. In the drawings for reference, FIG. 1 is a perspective view showing the exterior of the disc brake apparatus in accordance with an embodiment of the present invention, FIG. 2 is a front view of a brake pad mounted to the disc brake apparatus shown in FIG. 1, and FIG. 3 is a plan view of the brake pad shown in FIG. 2.

Figure 1:
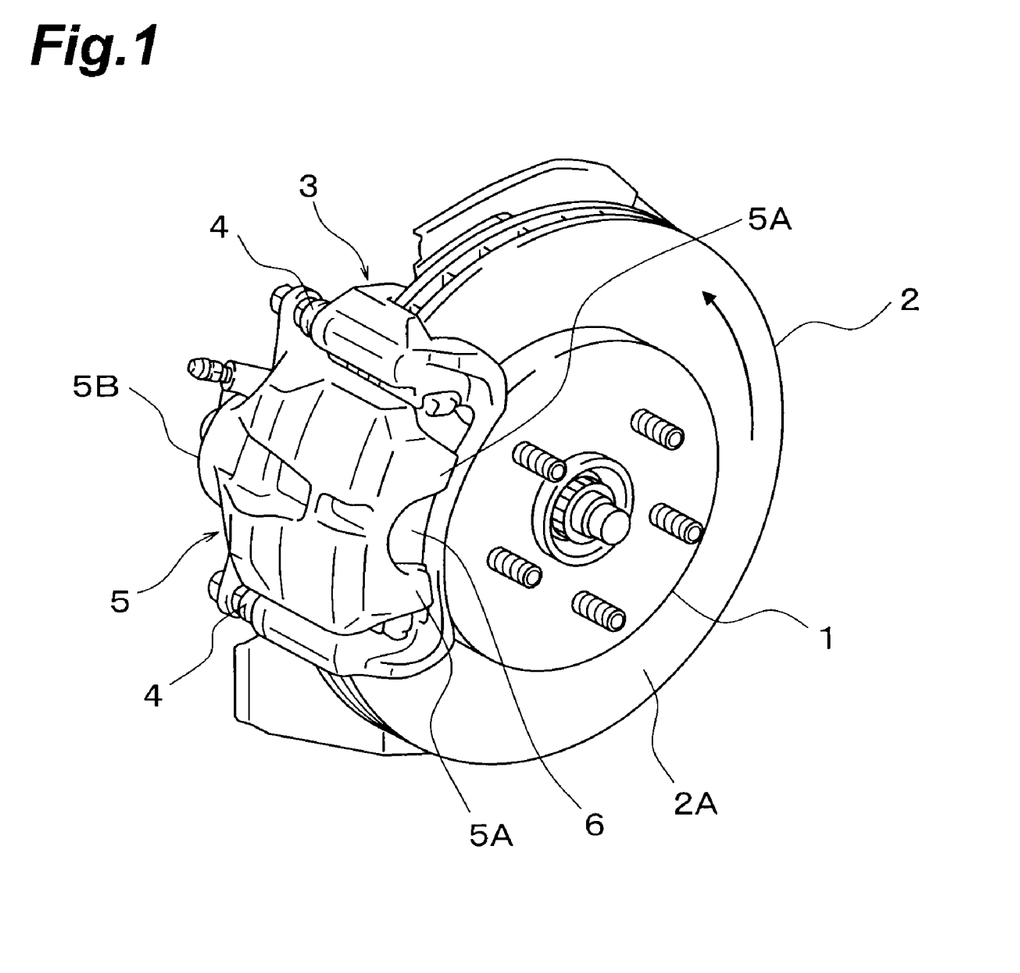
FIG. 1 is a perspective view showing the exterior of the disc brake apparatus in accordance with an embodiment of the present invention.

The disc brake apparatus in accordance with this embodiment is constructed for a vehicle and comprises a disc rotor 2 which is secured to a hub 1 of an axle and rotates integrally therewith, a mounting (torque member) 3 supported by an undepicted suspension part or the like of a vehicle body and arranged so as to straddle an outer peripheral part of the disc rotor 2, a floating caliper 5 which is attached to the mounting 3 with a pair of slide pins 4, 4 such as to be slidable in parallel with the rotary axis of the disc rotor 2, and a pair of inner and outer brake pads 6 (only the outer one being depicted while not showing the inner one) mounted between the caliper 5 and disc rotor 2, for example, as shown in FIG. 1.

The disc rotor 2 rotates in the arrowed direction in FIG. 1 and the direction opposite thereto when the vehicle runs forward and backward, respectively. At the time of forward braking and backward braking of the vehicle, rotor surfaces in the outer peripheral part of the disc rotor 2 are held between the pair of inner and outer brake pads 6. A forward braking torque receiving part and a backward braking torque receiving part are formed on the inner and outer end sides of the mounting 3, respectively, so as to receive brake torques fed to the pair of inner and outer brake pads 6 from the disc rotor 2 at that time.

Figure 2:
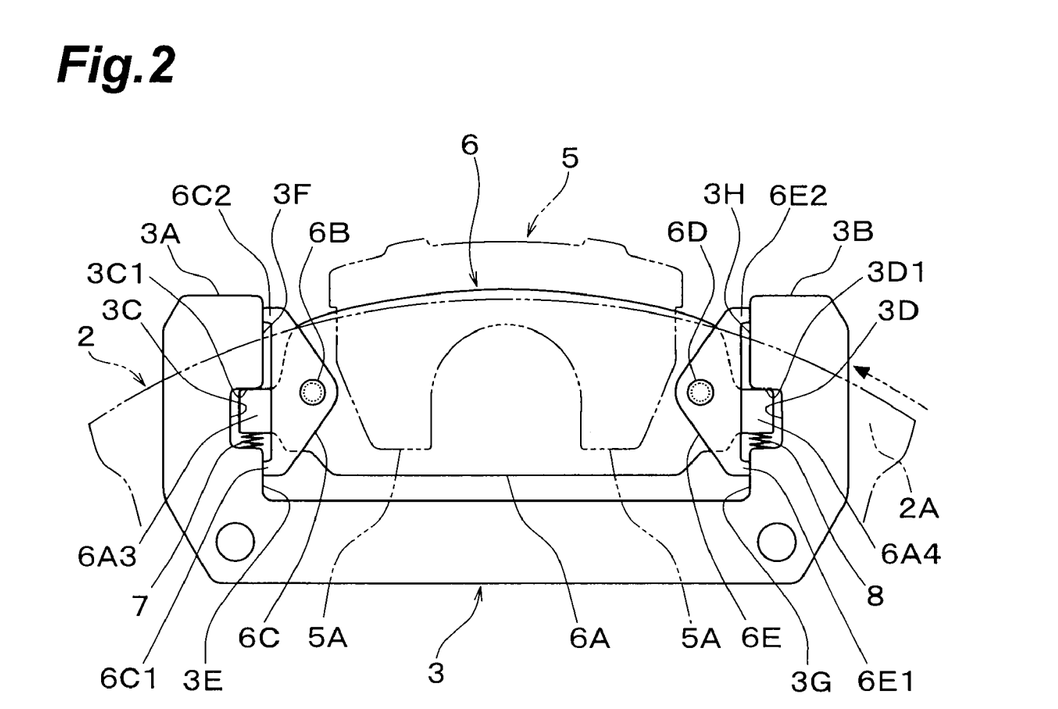
FIG. 2 is a front view of a brake pad mounted to the disc brake apparatus shown in FIG. 1.
Figure 3:
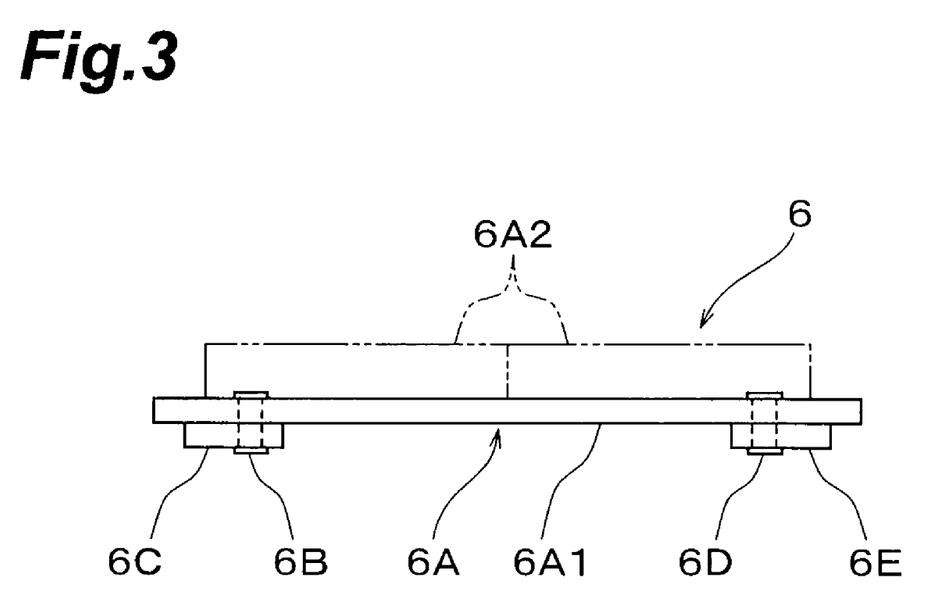
FIG. 3 is a plan view of the brake pad shown in FIG. 2.

For example, as shown in FIG. 2, a pair of arm-shaped forward and backward braking torque receiving parts 3A, 3B for receiving the brake torques fed to one brake pad 6 from the outer rotor surface 2A of the disc rotor 2 are formed on the outer end side of the mounting 3 opposing the outer rotor surface 2A of the disc rotor 2. The surfaces opposing the forward and backward braking torque receiving parts 3A, 3B are formed with rectangular grooves 3C, 3D which extend in parallel with the rotary axis of the disc rotor 2, respectively.

Though not depicted, a pair of arm-shaped forward and backward braking torque receiving parts similar to the forward and backward braking torque receiving parts 3A, 3B are formed on the inner end side of the mounting 3. The surfaces opposing these forward and backward braking torque receiving parts are formed with rectangular grooves similar to the rectangular grooves 3C, 3D.

As shown in FIG. 1, the caliper 5 is arranged such as to straddle the outer peripheral part of the disc rotor 2, while an outer end part of the caliper 5 opposing the outer rotor surface 2A of the disc rotor 2 is provided with a pair of claws 5A, 5A which press one brake pad 6 on the outer side to the outer rotor surface 2A of the disc rotor 2. An inner end part opposing the inner rotor surface of the disc rotor 2 is provided with a cylinder part 5B in which a piston for pressing the undepicted other brake pad on the inner side against the inner rotor surface of the disc rotor 2 is inserted.

The piston inserted in the cylinder part 5B of the caliper 5 is constructed such as to advance and retract in parallel with the rotary axis of the disc rotor 2 in response to a brake hydraulic pressure supplied to the cylinder part 5B through an undepicted brake pipe of the vehicle.

Since the pair of brake pads 6 are constructed similar to each other, one brake pad 6 will be explained as their representative. As shown in FIG. 2, the brake pad 6 is constituted by a main body member 6A which is pressed against the outer rotor surface 2A of the disc rotor 2 by the pair of claws 5A, 5A of the caliper 5, a forward braking torque transmitting member 6C which is connected to one end part of the main body member 6A so as to be rotatable relative thereto through one pin joint 6B, and a backward braking torque transmitting member 6E which is connected to the other end part of the main body member 6A so as to be rotatable relative thereto through the other pin joint 6D.

Here, as shown in FIG. 3, the main body member 6A constituting the brake pad 6 has a structure in which a pad member 6A2 opposing the outer rotor surface 2A of the disc rotor 2 is joined to a backing metal 6A1 opposing the pair of claws 5A, 5A of the caliper 5. On the other hand, the forward braking torque transmitting member 6C and backward braking torque transmitting member 6E constituting the brake pad 6 are constructed by only a metal sheet similar to that of the backing metal 6A1 of the main body member 6A.

As shown in FIG. 2, one end part of the backing metal 6A1 constituting the main body member 6A of the brake pad 6 is formed with a rectangular projection 6A3 which is inserted into the rectangular groove 3C formed in the forward braking torque receiving part 3A of the mounting 3, while the other end part of the backing metal 6A1 is formed with a rectangular projection 6A4 which is inserted into the rectangular groove 3D formed in the forward braking torque receiving part 3B of the mounting 3.

Provided between the rectangular groove 3C and rectangular projection 6A3 is a spring member 7 which presses the projection 6A3 to the radially outer side of the disc rotor 2, so that the projection 6A3 abuts against one wall face 3C1 of the rectangular groove 3C. Similarly provided between the rectangular groove 3D and rectangular projection 6A4 is a spring member 8 which presses the projection 6A4 to the radially outer side of the disc rotor 2, so that the projection 6A4 abuts against one wall face 3D1 of the rectangular groove 3D.

Here, the braking torque transmitting member 6C arranged on one end part side of the brake pad 6 to become the turning-out side of the disc rotor 2 when the vehicle runs forward is formed with two torque transmitting protrusions 6C1, 6C2 at locations separated from the pin joint 6B on the radially inner and outer sides of the disc rotor 2. The two torque transmitting protrusions 6C1, 6C2 abut against torque receiving surfaces 3E, 3F on both sides of the rectangular groove 3C formed in the forward braking torque receiving part 3A of the mounting 3, thereby transmitting the braking torque at the time of forward braking to the forward braking torque receiving part 3A.

Similarly, the braking torque transmitting member 6E arranged on the other end part side of the brake pad 6 to become the turning-out side of the disc rotor 2 when the vehicle runs backward is formed with two torque transmitting protrusions 6E1, 6E2 at locations separated from the pin joint 6D on the radially inner and outer sides of the disc rotor 2. The two torque transmitting protrusions 6E1, 6E2 abut against torque receiving surfaces 3G, 3H on both sides of the rectangular groove 3D formed in the backward braking torque receiving part 3B of the mounting 3, thereby transmitting the braking torque at the time of backward braking to the backward braking torque receiving part 3B.

When a braking operation is effected by an undepicted brake pedal of the vehicle in thus constructed disc brake apparatus in accordance with this embodiment, a brake hydraulic pressure corresponding to the stepping action of the brake pedal is supplied to the cylinder part 5B of the caliper 5 shown in FIG. 1, whereby the undepicted piston advances. The piston pushes the backing metal of the main body member of the undepicted other brake pad, whereby its reaction force causes the claws 5A, 5A of the caliper 5 to push the backing metal 6A1 of the main body member 6A of one brake pad 6. As a result, the pad member 6A2 of one brake pad 6 comes into frictional contact with the outer rotor surface 2A of the disc rotor 2, while the pad member of the other brake pad comes into frictional contact with the inner rotor surface of the disc rotor 2, thus yielding a braking force.

Figure 4:
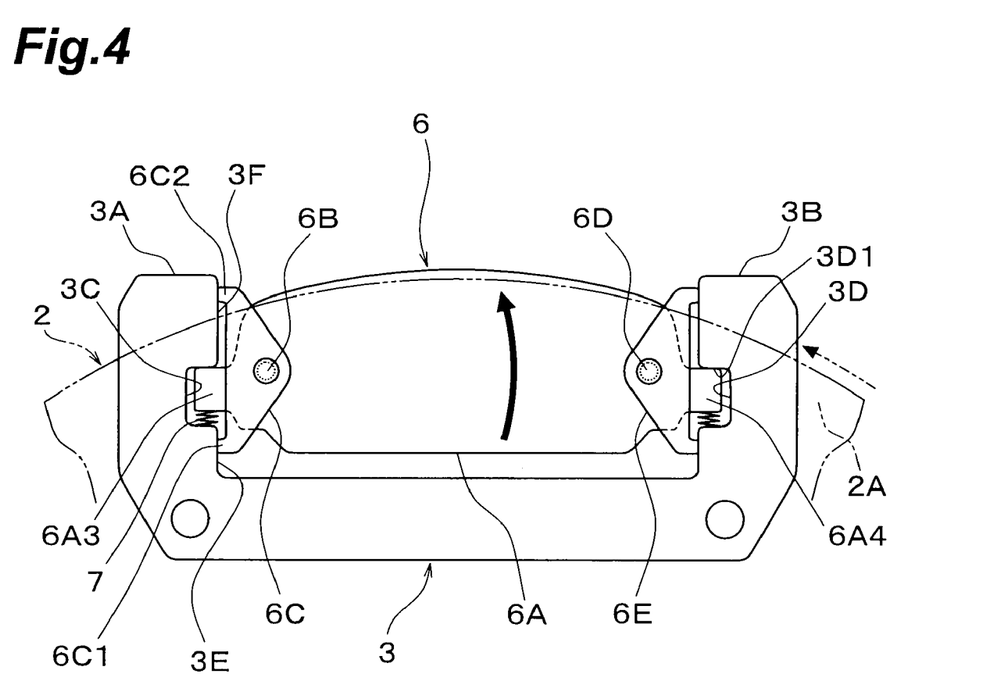
FIG. 4 is a front view corresponding to FIG. 2 and showing a behavior of the brake pad at the time of forward braking of a vehicle.

At the time of forward braking of the vehicle where the disc rotor 2 rotates normally in the arrowed direction shown in FIG. 4, the brake torque fed to the main body member 6A of the brake pad 6 from the disc rotor 2 is transmitted from the two torque transmitting protrusions 6C1, 6C2 of the forward braking torque transmitting member 6C to the torque receiving surfaces 3E, 3F formed in the forward braking torque receiving part 3A of the mounting 3, so as to achieve a forward braking state.

In this forward braking state, the brake torque fed from the disc rotor 2 causes a rotational moment in the arrowed direction about one pin joint 6B to act on the main body member 6A of the brake pad 6, so that the projection 6A3 in one end part of the main body member 6A deflects the spring member 7, whereby the projection 6A4 in the other end part of the main body member 6A abuts against one wall face 3D1 of the rectangular groove 3D formed in the backward braking torque receiving part 3B of the mounting 3.

At this time, the rotational moment in the arrowed direction acting on the main body member 6A is absorbed by the main body member 6A rotating relative to the forward braking torque transmitting member 6C about one pin joint 6B, so as to be restrained from being transmitted to the forward braking torque transmitting member 6C. As a result, the respective contact states between the two torque transmitting protrusions 6C1, 6C2 formed in the forward braking torque transmitting member 6C of the brake pad 6 and the torque receiving surfaces 3E, 3F formed in the forward braking torque receiving part 3A of the mounting 3 can be held stable.

Namely, even when the rotational moment acting on the main body member 6A varies dependent on the surface pressure distribution between the outer rotor surface 2A of the disc rotor 2 and the pad member 6A2 of the main body member 6A of the brake pad 6, stable contact states can be held between the two torque transmitting protrusions 6C1, 6C2 formed in the forward braking torque transmitting member 6C of the brake pad 6 and the torque receiving surfaces 3E, 3F formed in the forward braking torque receiving part 3A of the mounting 3. Therefore, the brake pad 6 is restrained from vibrating at the time of forward braking of the vehicle, whereby the brake noise phenomenon is reliably suppressed.

Figure 5:
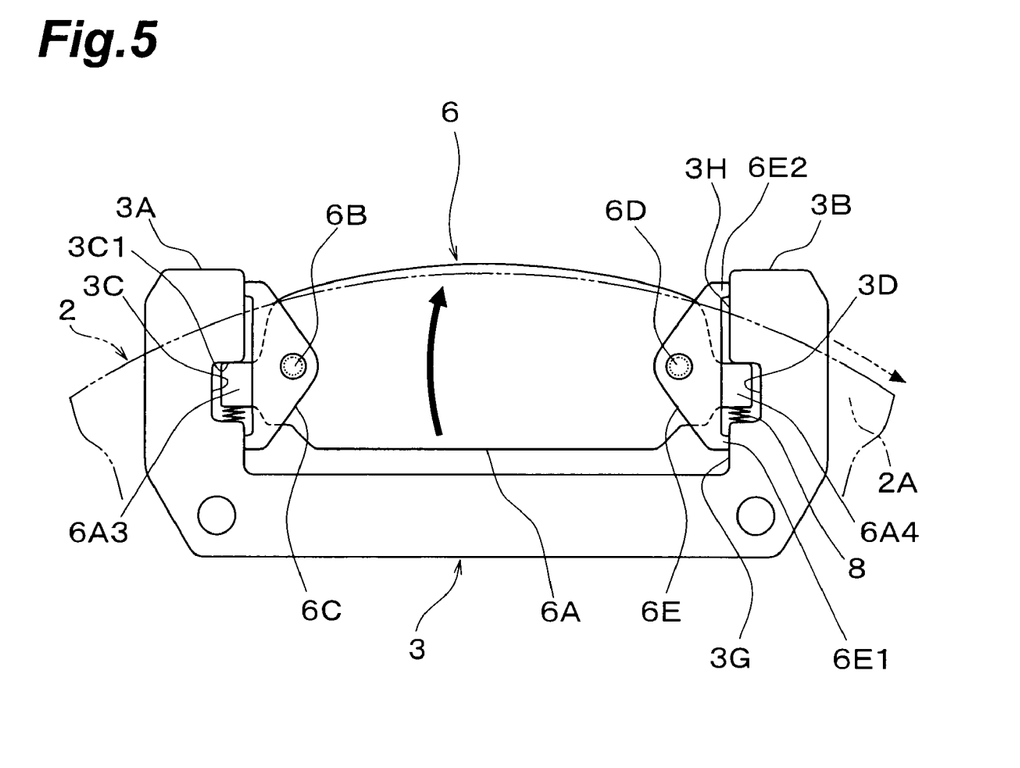
FIG. 5 is a front view corresponding to FIG. 2 and showing a behavior of the brake pad at the time of backward braking of the vehicle.

At the time of backward braking of the vehicle where the disc rotor 2 rotates reversely in the arrowed direction shown in FIG. 5, on the other hand, the brake torque fed to the main body member 6A of the brake pad 6 from the disc rotor 2 is transmitted from the two torque transmitting protrusions 6E1, 6E2 of the backward braking torque receiving part 6E to the torque receiving surfaces 3G, 3H formed in the backward braking torque receiving part 3B of the mounting 3, so as to achieve a backward braking state.

In this backward braking state, the brake torque fed from the disc rotor 2 causes a rotational moment in the arrowed direction about the other pin joint 6D to act on the main body member 6A of the brake pad 6, so that the projection 6A4 in the other end part of the main body member 6A deflects the spring member 8, whereby the projection 6A3 in one end part of the main body member 6A abuts against one wall face 3C1 of the rectangular groove 3C formed in the forward braking torque receiving part 3A of the mounting 3.

At this time, the rotational moment in the arrowed direction acting on the main body member 6A is absorbed by the main body member 6A rotating relative to the backward braking torque transmitting member 6E about the other pin joint 6D, so as to be restrained from being transmitted to the backward braking torque transmitting member 6E. As a result, the respective contact states between the two torque transmitting protrusions 6E1, 6E2 formed in the backward braking torque transmitting member 6E of the brake pad 6 and the torque receiving surfaces 3G, 3H formed in the backward braking torque receiving part 3B of the mounting 3 can be held stable.

Namely, even when the rotational moment acting on the main body member 6A varies dependent on the surface pressure distribution between the outer rotor surface 2A of the disc rotor 2 and the pad member 6A2 of the main body member 6A of the brake pad 6, stable contact states can be held between the two torque transmitting protrusions 6E1, 6E2 formed in the backward braking torque transmitting member 6E of the braking pad 6 and the torque receiving surfaces 3G, 3H formed in the forward braking torque receiving part 3B of the mounting 3. Therefore, the brake pad 6 is restrained from vibrating at the time of backward braking of the vehicle, whereby the brake noise phenomenon is reliably suppressed.

Hence, the disc brake apparatus in accordance with this embodiment can keep a stable contact state between the torque transmitting member 6C of the brake pad 6 and the forward braking torque receiving part 3A of the mounting 3 at the time of forward braking of the vehicle, and a stable contact state between the torque transmitting member 6E of the brake pad 6 and the backward braking torque receiving part 3B of the mounting 3 at the time of backward braking of the vehicle. As a result, the brake pad 6 can be restrained from vibrating, whereby the brake noise phenomenon can reliably be suppressed.

The disc brake apparatus in accordance with the present invention is not limited to the above-mentioned one embodiment. For example, the projections 6A3, 6A4 formed in one end part and the other end part of the main body member 6A of the brake pad 6 shown in FIG. 2 may be formed on the forward braking torque transmitting member 6C side and the backward braking torque transmitting member 6E side, respectively.

The forward braking torque receiving part 3A may be formed with an appropriate stopper for restraining the torque transmitting protrusion 6C2 of the forward braking torque transmitting member 6C from moving to the radially outer side of the disc rotor 2. In this case, the projection 6A3 in one end part of the main body member 6A and the rectangular groove 3C and spring member 7 of the forward braking torque receiving part 3A can be omitted.

Similarly, the backward braking torque receiving part 3B may be formed with an appropriate stopper for restraining the torque transmitting protrusion 6E2 of the backward braking torque transmitting member 6E from moving to the radially outer side of the disc rotor 2. In this case, the projection 6A4 in the other end part of the main body member 6A and the rectangular groove 3D and spring member 8 of the backward braking torque receiving part 3B can be omitted.

One pin joint 6B and the other pin joint 6D shown in FIG. 3 may have a structure clad with a rubber bush for damping vibration. This can more effectively restrain the brake pad 6 from vibrating, so as to suppress the brake noise phenomenon more reliably.

In view of the fact that the backward braking of the vehicle occurs much less frequently than the forward braking, the backward braking torque transmitting member 6E connected to the main body member 6A of the brake pad 6 through the other pin joint 6D may be omitted.

The disc brake apparatus of the present invention can be employed for braking rotary parts of various mechanical apparatus without being restricted to vehicles.

INDUSTRIAL APPLICABILITY

The disc brake apparatus in accordance with the present invention can keep a stable contact state between the torque transmitting member of the brake pad and the torque receiving part of the mounting at the time of braking, thereby restraining the brake pad from vibrating, thus reliably suppressing the brake noise phenomenon.

The invention claimed is:

1. A disc brake apparatus, comprising:
a brake pad; and
a mounting including a torque receiving part arranged in such a manner that a brake torque fed to the brake pad from a disc rotor is receivable by the torque receiving part of the mounting, wherein
the brake pad is divided into a main body member via which the brake torque is receivable while the main body member is pressed against the disc rotor, and a torque transmitting member via which the brake torque is transmittable while abutting to the torque receiving part of the mounting,
the main body member and the torque transmitting member are rotatably connected to each other so that absorption of the rotational moment acting on the brake pad at the time of braking is effected by the main body member of the brake pad rotating relative to the torque transmitting member, and
the torque transmitting member of the brake pad moves relative to the torque receiving part of the mounting.

2. A disc brake apparatus according to claim 1, wherein the main body member and torque transmitting member are connected through a pin joint rotatable to each other.

3. A disc brake apparatus according to claim 1, wherein the torque transmitting member of the brake pad abuts against the torque receiving part of the mounting by two or more points.

4. A disc brake apparatus according to claim 1, wherein the main body member has a structure that abuts against the torque receiving part of the mounting such as to suppress a rotational moment acting on the main body member.

5. A disc brake apparatus according to claim 2, wherein the torque transmitting member of the brake pad abuts against the torque receiving part of the mounting at two points.

6. A disc brake apparatus according to claim 2, wherein the main body member has a structure that abuts against the torque receiving part of the mounting such as to suppress a rotational moment acting on the main body member.

7. A disc brake apparatus according to claim 3, wherein the main body member has a structure that abuts against the torque receiving part of the mounting such as to suppress a rotational moment acting on the main body member.

8. A disc brake apparatus according to claim 5, wherein the main body member has a structure that abuts against the torque receiving part of the mounting such as to suppress a rotational moment acting on the main body member.

9. A disc brake apparatus, comprising:
a brake pad; and
a mounting including a torque receiving part arranged in such a manner that a brake torque fed to the brake pad from a disc rotor is receivable by the torque receiving part of the mounting, wherein
the brake pad is divided into a main body member via which the brake torque is receivable while the main body member is pressed against the disc rotor, and a torque transmitting member via which the brake torque is transmittable while abutting to the torque receiving part of the mounting,
the main body member and the torque transmitting member are rotatably connected to each other so that absorption of the rotational moment acting on the brake pad at the time of braking is effected by the main body member of the brake pad rotating relative to the torque transmitting member,
the torque receiving part of the mounting includes a groove that extends parallel with an axis of the disc rotor; and
the main body member includes a projection that abuts the groove.

10. A disc brake apparatus according to claim 9, wherein a spring member is provided between the groove and the projection so that the projection abuts the groove.

11. A disc brake apparatus according to claim 9, wherein:
the groove is a rectangular groove; and
the projection is a rectangular projection that extends from an end of the main body member.

12. A disc brake apparatus according to claim 9, wherein the torque transmitting member includes two protrusions that abut torque receiving surfaces on opposite sides of the groove.

13. A disc brake apparatus, comprising:
a brake pad; and
a mounting including a torque receiving part arranged in such a manner that a brake torque fed to the brake pad from a disc rotor is receivable by the torque receiving part of the mounting, wherein
the brake pad is divided into a main body member via which the brake torque is receivable while the main body member is pressed against the disc rotor, and a torque transmitting member including a plurality of protrusions that abut the torque receiving part via which the brake torque is transmittable while abutting to the torque receiving part of the mounting, and
the main body member and the torque transmitting member are rotatably connected to each other through a pin so that absorption of the rotational moment acting on the brake pad at the time of braking is effected by the main body member of the brake pad rotating relative to the torque transmitting member.

14. A disc brake apparatus according to claim 13, wherein the torque transmitting member is a metal sheet.

15. A disc brake apparatus according to claim 13, wherein the plurality of protrusions are two protrusions that abut torque receiving surfaces of the torque receiving part on opposite sides of a rectangular groove of the torque receiving part.

16. A disc brake apparatus according to claim 15, wherein the two protrusions are at an end of the torque transmitting member distal to the pin.

* * * * *